US010208234B2

(12) United States Patent
Kujak

(10) Patent No.: US 10,208,234 B2
(45) Date of Patent: Feb. 19, 2019

(54) REFRIGERANT ADDITIVES AND COMPOSITIONS

(71) Applicant: TRANE INTERNATIONAL INC., Davidson, NC (US)

(72) Inventor: Stephen Anthony Kujak, Brownsville, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 15/881,975

(22) Filed: Jan. 29, 2018

(65) Prior Publication Data

US 2018/0215978 A1 Aug. 2, 2018

Related U.S. Application Data

(63) Continuation of application No. 14/763,212, filed as application No. PCT/US2014/013040 on Jan. 24, 2014, now Pat. No. 9,879,164.

(60) Provisional application No. 61/756,674, filed on Jan. 25, 2013.

(51) Int. Cl.
C09K 5/04 (2006.01)

(52) U.S. Cl.
CPC .............. *C09K 5/042* (2013.01); *C09K 5/044* (2013.01); *C09K 5/045* (2013.01); *C09K 2205/126* (2013.01); *C09K 2205/24* (2013.01)

(58) Field of Classification Search
CPC ........ C09K 5/042; C09K 5/044; C09K 5/045; C09K 5/04; C09K 2205/126; C09K 2205/24
USPC ................................... 252/67, 68, 69; 62/77
See application file for complete search history.

(56) References Cited

U.S. PATENT DOCUMENTS

| | | | |
|---|---|---|---|
| 4,864,831 A | 9/1989 | Hino | |
| 5,108,632 A | 4/1992 | Thomas et al. | |
| 5,318,716 A | 6/1994 | Bartlett et al. | |
| 5,442,931 A | 8/1995 | Ryan et al. | |
| 5,458,798 A | 10/1995 | Lunger et al. | |
| 5,505,059 A | 4/1996 | Sanborn | |
| 5,624,596 A | 4/1997 | Lunger et al. | |
| 5,635,098 A | 6/1997 | Lunger et al. | |
| 5,670,079 A | 9/1997 | Lunger et al. | |
| 5,842,349 A | 12/1998 | Wakita et al. | |
| 6,564,560 B2 | 5/2003 | Butterworth et al. | |
| 7,128,528 B2 | 10/2006 | Takayasu et al. | |
| 7,234,310 B2 | 6/2007 | Flynn et al. | |
| 7,759,532 B2 | 7/2010 | Leck et al. | |
| 8,037,713 B2 | 10/2011 | Haley et al. | |
| 8,038,899 B2 | 10/2011 | Yana Motta et al. | |
| 8,066,900 B2 | 11/2011 | Owens | |
| 8,246,851 B2 | 8/2012 | Roberts et al. | |
| 9,404,678 B2 | 8/2016 | Van Horn et al. | |
| 2001/0037651 A1 | 11/2001 | Butterworth et al. | |
| 2002/0127161 A1 | 9/2002 | Sgarbi | |
| 2009/0127497 A1 | 5/2009 | Spatz et al. | |
| 2009/0267019 A1 | 10/2009 | Yana Motta et al. | |
| 2010/0257881 A1 | 10/2010 | Perti | |
| 2010/0326095 A1 | 12/2010 | Van Horn et al. | |
| 2011/0017942 A1 | 1/2011 | Bivens et al. | |
| 2011/0079749 A1 | 4/2011 | Carr et al. | |
| 2011/0144216 A1* | 6/2011 | Hulse ................. A01N 29/02 514/757 |
| 2011/0147638 A1* | 6/2011 | Robin ................. A62D 1/0057 252/2 |
| 2011/0309288 A1 | 12/2011 | Chen et al. | |
| 2011/0312101 A1 | 12/2011 | Tsuchiya et al. | |
| 2012/0007016 A1 | 1/2012 | Abbas | |
| 2012/0011864 A1 | 1/2012 | Leck et al. | |
| 2012/0037841 A1 | 2/2012 | Galvao | |
| 2012/0042668 A1 | 2/2012 | Nappa et al. | |
| 2012/0138846 A1 | 6/2012 | Van Horn et al. | |
| 2012/0138847 A1 | 6/2012 | Van Horn et al. | |
| 2012/0145946 A1 | 6/2012 | Minor | |
| 2012/0167599 A1* | 7/2012 | Kontomaris ........... C09K 5/045 62/77 |
| 2012/0204594 A1 | 8/2012 | Singh et al. | |
| 2013/0255284 A1* | 10/2013 | Rached ................. C09K 5/045 62/77 |
| 2014/0077122 A1 | 3/2014 | Fukushima | |
| 2014/0131614 A1 | 5/2014 | Fukushima | |
| 2014/0165626 A1* | 6/2014 | Van Horn .............. C09K 5/044 62/79 |
| 2014/0174084 A1* | 6/2014 | Kontomaris ........... F01K 25/10 60/651 |
| 2014/0275305 A1 | 9/2014 | Svenson et al. | |
| 2014/0371338 A1 | 12/2014 | Chen et al. | |
| 2015/0197614 A1 | 7/2015 | Chen et al. | |
| 2016/0130416 A1 | 5/2016 | Chen et al. | |
| 2016/0272561 A1 | 9/2016 | Rached et al. | |
| 2017/0044462 A1 | 2/2017 | Takahashi et al. | |
| 2017/0174965 A1 | 6/2017 | Tsuchiya et al. | |
| 2017/0218311 A1 | 8/2017 | Tani et al. | |
| 2018/0264303 A1* | 9/2018 | Robin ................. A62D 1/0057 |

FOREIGN PATENT DOCUMENTS

| | | |
|---|---|---|
| CN | 1054791 A | 9/1991 |
| CN | 101402546 A | 4/2009 |

(Continued)

OTHER PUBLICATIONS

International search report for International application No. PCT/US2014/013040 dated Oct. 23, 2014 (3 pages).

(Continued)

*Primary Examiner* — Douglas J McGinty
(74) *Attorney, Agent, or Firm* — Hamre, Schumann, Mueller & Larson, P.C.

(57) ABSTRACT

Embodiments are described herein to provide refrigerant and/or refrigerant composition that is suitable for providing lubrication to, for example, moving parts of a chiller system. Embodiments are also described herein to provide an additive, such as a corrosion inhibitor and/or stabilizers, that can be added to the refrigerant to form refrigerant compositions that is suitable for providing lubrication to, for example, moving parts of a chiller system.

6 Claims, 2 Drawing Sheets

(56) References Cited

FOREIGN PATENT DOCUMENTS

| CN | 101473011 A | 7/2009 | | |
|---|---|---|---|---|
| CN | 101605863 A | 12/2009 | | |
| EP | 1387132 A1 | 2/2004 | | |
| WO | 0039243 | 7/2000 | | |
| WO | 2010/077898 A2 | 7/2010 | | |
| WO | WO-2011034929 A1 * | 3/2011 | ............ | C09K 5/045 |
| WO | 2012/157763 A1 | 11/2012 | | |

OTHER PUBLICATIONS

Written opinion for International application No. PCT/US2014/013040 dated Oct. 23, 2014 (5 pages).
CAS reg, No. 999-97-3, Nov. 16, 1984 (1 page).

* cited by examiner

REFRIGERANT ADDITIVES AND COMPOSITIONS

FIELD

The disclosure herein relates to heating, ventilation, and air-conditioning ("HVAC") systems, such as a chiller, and more particularly to a refrigerant composition of a chiller system, such as a refrigerant composition that may be suitable for lubrication applications, and/or an oil-free HVAC system.

BACKGROUND

A HVAC system, such as a chiller, generally includes a compressor, a condenser, an evaporator and an expansion device. In a cooling cycle of the HVAC system, the compressor can compress refrigerant vapor, and the compressed refrigerant vapor may be directed into the condenser to condense into liquid refrigerant. The liquid refrigerant can then be expanded by the expansion device and directed into the evaporator.

Components of the HVAC system, such as the compressor, may include moving parts, and may require lubrication during operation. Lubricants, such as oil, are commonly used in the HVAC system to lubricate the moving parts.

SUMMARY

Embodiments are described herein to provide refrigerant and/or refrigerant composition that is suitable for providing lubrication to, for example, moving parts of a chiller system. Embodiments are also described herein to provide an additive, such as a corrosion inhibitor and/or stabilizers, that can be added to the refrigerant to form refrigerant compositions suitable for providing lubrication to, for example, moving parts of a chiller system. The embodiments described herein can be suitable for an oil-free chiller system, in which no oil is added to provide lubrication.

In some embodiments, the preferred refrigerants for providing lubrication, for example, in the chiller system can include a refrigerant or refrigerant blends of HCFC (Hydrochlorofluorocarbons), HFC (Hydrofluorocarbons), HCFO (Hydrochlorofluoroolefin), and/or HFO (Hydrofluoroolefins). For example, the refrigerant or refrigerant blend can be at least one of or blends thereof of 1,1, dichloro-2,2,2 trifluoroethane, 1,1,1,2 tetrafluoroethane, 1,1,1,3,3 pentafluoropropane, difluromethane, 1,1 difluoroethane, 1-chloro-3,3,3 trifluoropropene (E), 1-chloro-3,3,3 trifluoropropene (Z), 2-chloro-3,3,3 trifluoropropene, 1,1,dichloro-3,3,3 trifluoropropene, 2,3,3,3 tetrafluoropropene, 1,3,3,3 tetrafluoropropene (E), 1,3,3,3 tetrafluoropropene (Z), 1,2 dichloro-3,3,3 trifluoropropene (E), 1,2 dichloro-3,3,3 trifluoropropene (Z), 1,1,3 trichloro-3,3,3 trifluoropropene, 1,2 dichloroethylene (E), 1,2 dichloroethylene (Z), 1,1 dichloroethylene, 1,1,1,4,4,4 hexafluorobutene (Z), 1,1,1,4,4,4 hexafluorobutene (E), 1,1,1,2,3 pentafluoropropane, 1,1,1,3,3 pentafluoropropane, Isopentane, and pentane. In some embodiments, the refrigerant blend can be 1-chloro-3,3,3 trifluoroethene (E) with about 10 to about 50% of 1,1,1,4,4,4 hexafluorobutene (E); 1-chloro-3,3,3 trifluoroethene (E) with about 10 to about 50% of 1,1,1,2,3 pentafluorobutane; 1-chloro-3,3,3 trifluoroethene (E) with about 10 to about 50% of 1,1,1,3,3 pentafluorobutane; 1-chloro-3,3,3 trifluoroethene (E) with about 10 to about 50% of 1,1,2,2,3 pentafluorobutane; 1,1,1,4,4,4 hexafluorobutene (E) with about 10 to about 50% of 1,1,1,2,3 pentafluorobutane; 1,1,1,4,4,4 hexafluorobutene (E) with about 10 to about 50% of 1,1,1,3,3 pentafluorobutane; or 1,1,1,4,4,4 hexafluorobutene (E) with about 10 to about 50% of 1,1,2,2,3 pentafluorobutane.

In some embodiments, an additive, such as a corrosion inhibitor and/or a stabilizer can include at least one of or blends there of epoxides (such as aromatic epoxides, alkyl epoxides, alkenyl epoxides), terpenes, terpenoids, fullerenes, ascorbic acid, terephthalate, nitromethane, unsaturated hydrocarbons or unsaturated halocarbons, phenols, perfluoropolyether, hindered phenols, hydroxylamines, thiols, phosphites and lactones, siloxane, tolytriazoles, benzotriazole, amines, hydrazine, hexamine, phenylenediamine, dimethyethanolamine, zinc dithiophosphates, quaternary and acyclic amines, quaternized alkyl pyridine, amine/phosphate ester salt, cinnamaldehyde, dibutylamine, diethylhydroxylamine, dimethylethanolamine, 3,5 dinitrobenzoic acid, ethylenediamine, hexamethyleneteramine, 1,2 diaminopropane. It will be appreciated that the additive(s) and/or stabilizer(s) employed would be suitable and compatible for use with the refrigerant(s) of the system(s) and with the structural components of the system(s) itself.

In some embodiments, the additive may be added to the refrigerant in amounts of from about 0.001% to about 10%, more preferably from about 0.01% to about 1% by a weight of the refrigerant. In one preferred embodiment, tolytriazoles and/or benzotriazole may be added to the refrigerant in a range of 0.001% to 0.5% by a weight of the refrigerant. In another preferred embodiment, hydroxylamines or dimethylethanol amine may be added to the refrigerant in a range of 0.001% to 0.5% by a weight of the refrigerant.

Other features and aspects of the fluid management approaches will become apparent by consideration of the following detailed description and accompanying drawings.

DETAILED DESCRIPTION

A HVAC system, such as a chiller system, may commonly include components with moving parts, such as rollers and balls of a bearing of a compressor. The moving parts generally require proper lubrication. The lubrication is commonly provided by lubricants, such as oil, to form a liquid lubricant layer to separate two surfaces of the moving parts that have the relative movement. For example, to extend the service life of a roller bearing, the balls and the rollers of the bearing can be coated with a lubricant layer to separate the mating surfaces of the rollers and the balls so that the balls and the roller do not directly contact with each other during operation.

In some HVAC systems, the lubrication can be provided by liquid refrigerant. Such a HVAC system is sometimes called an oil-free system. In the oil-free system, liquid refrigerant can be directed to surfaces of the moving parts and form a liquid layer to separate two mating surfaces of the moving parts. Issues of using refrigerant as a lubricant may include poor boundary lubrication, which may in result contact between the two mating surfaces and a relatively high local temperature due to the contact. The relatively high temperature can break down the refrigerant, causing formation of, for example, highly aggressive acid (such as hydrofluoric and hydrochloric acid), refrigerant polymerization and/or residue products. The acid may react with materials of the moving parts, causing corrosion of the moving parts. The refrigerant polymerization and/or residue products can deposit on parts with critical tolerances, such as orifices, seals and/or bearings, which may also lead to premature failure. Improvements can be made to refrigerant and/or refrigerant compositions that are suitable for providing lubrication, such as in an oil-free system.

Embodiments are described herein to provide refrigerant that is suitable for providing lubrication to, for example, moving parts of a chiller system. Embodiments are also described herein to provide an additive, such as a corrosion inhibitor and/or a stabilizer that can be added to the refrigerant to form refrigerant compositions that are suitable for providing lubrication to, for example, moving parts of a chiller system. For example, race and bearing surfaces may be formed of high martensitic stainless steel or other ball bearings that are of hot isostatic pressed silicon nitride materials.

Mating surfaces of moving parts, such as the mating surfaces of a roller and a ball, may contact each other during operation, causing an elevated local temperature during operation. In some embodiments, the temperature can be between about 300° F. to about 1200° F. The refrigerant suitable for providing lubrication may be relatively chemically stable at temperatures between about 300° F. to about 1200° F.

Figure 1:
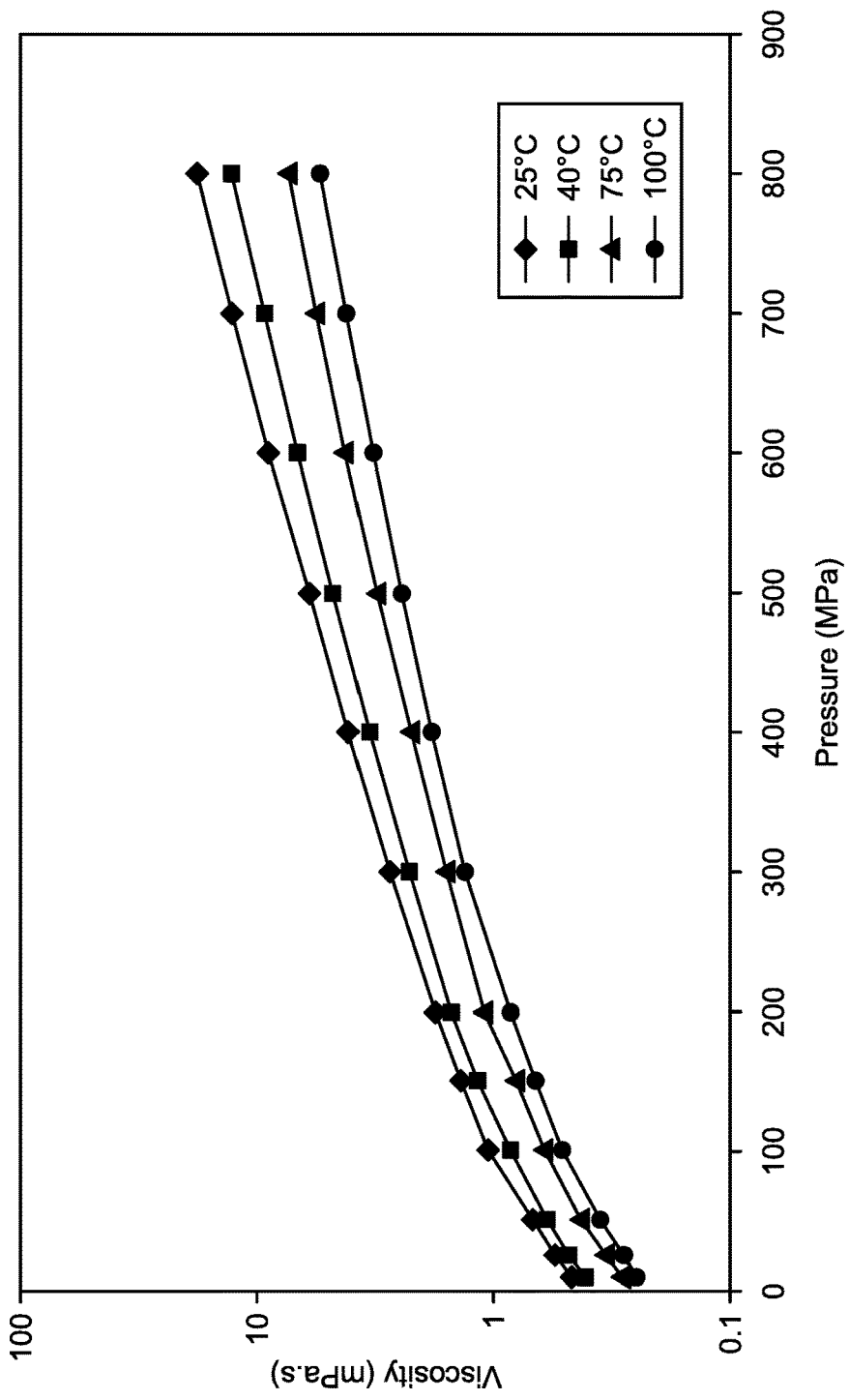
FIG. 1 shows a graph of the effects on refrigerant R123 viscosity as result of pressure and temperature changes.
Figure 2:
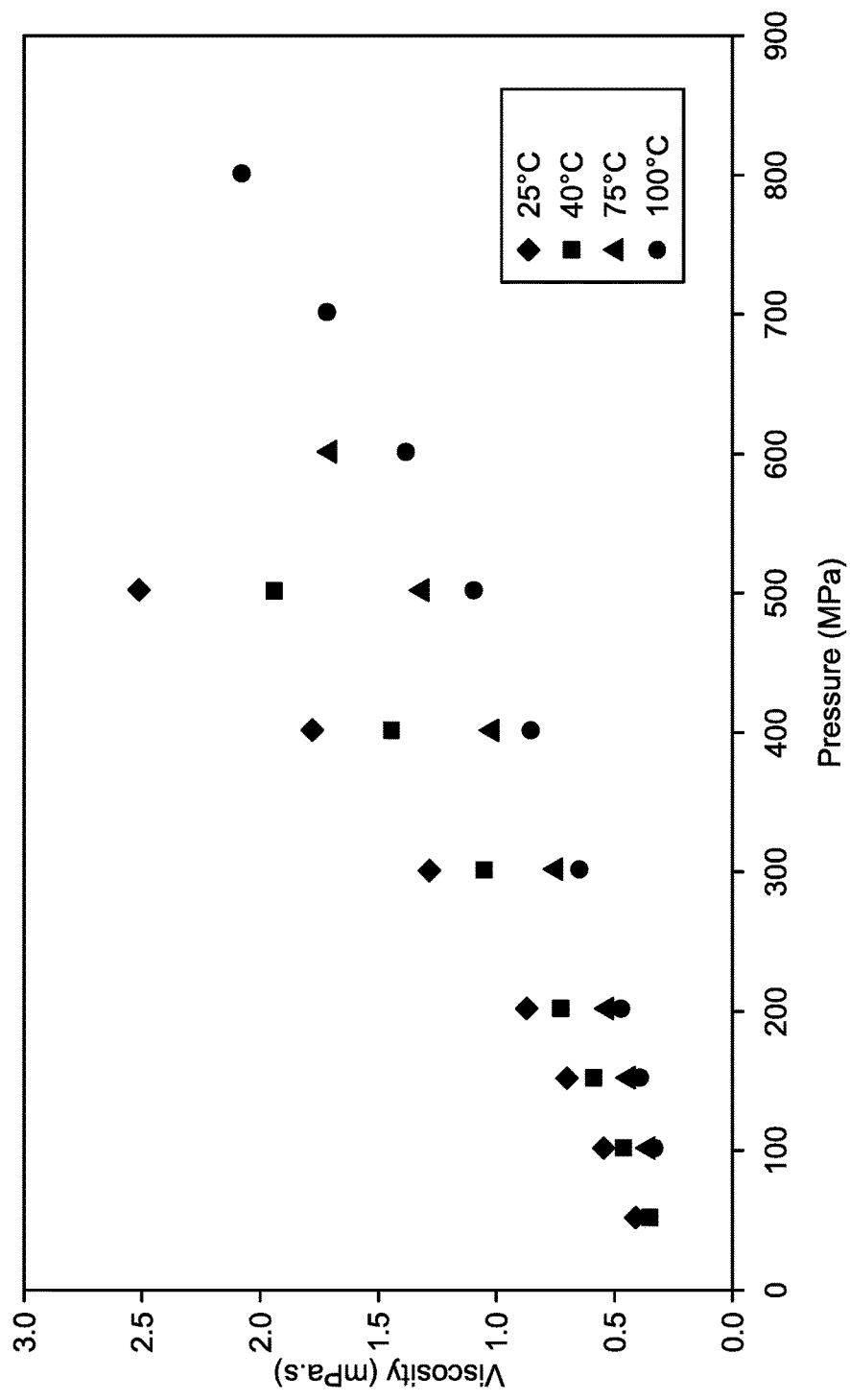
FIG. 2 shows another graph of the effects on refrigerant R134a viscosity as result of pressure and temperature changes.

It is known in the art that when liquid refrigerant is used to provide lubrication, a thickness of a liquid refrigerant layer on the mating surfaces is affected by a pressure-viscosity coefficient of the liquid refrigerant. The pressure-viscosity coefficient is an inherent property of the refrigerant. It measures a correlation between the viscosity of the refrigerant and the pressure at a given temperature. In some embodiments, the refrigerant that is suitable for providing lubrication may have a viscosity of about 0.2 to 2 mPa. when the pressure is between about 100 to 300 MPa and the temperature is between 25° C. to 100° C. See e.g. FIGS. 1 and 2 for examples of the effects on HCFC refrigerant R123 and HFC refrigerant R134a. It is to be appreciated that the pressure-viscosity coefficient of other refrigerants and/or refrigerant blends can be obtained.

It is appreciated that the refrigerant or refrigerant blend described herein can have a suitable pressure-viscosity coefficient for providing lubrication in a HVAC system, which can include at least one of or blends thereof of 1,1, dichloro-2,2,2 trifluoroethane, 1,1,1,2 tetrafluoroethane, 1,1,1,3,3 pentafluoropropane, difluromethane, 1,1 difluoroethane, 1-chloro-3,3,3 trifluoropropene (E), 1-chloro-3,3,3 trifluoropropene (Z), 2-chloro-3,3,3 trifluoropropene, 1,1,dichloro-3,3,3 trifluoropropene, 2,3,3,3 tetrafluoropropene, 1,3,3,3 tetrafluoropropene (E), 1,3,3,3 tetrafluoropropene (Z), 1,2 dichloro-3,3,3 trifluoropropene (E), 1,2 dichloro-3,3,3 trifluoropropene (Z), 1,1,3 trichloro-3,3,3 trifluoropropene, 1,2 dichloroethylene (E), 1,2 dichloroethylene (Z), 1,1 dichloroethylene, 1,1,1,4,4,4 hexafluorobutene (Z), 1,1,1,4,4,4 hexafluorobutene (E), 1,1,1,2,3 pentafluoropropane, 1,1,1,3,3 pentafluoropropane, Isopentane, and pentane. In some embodiments, the refrigerant blend having suitable pressure-viscosity coefficient for providing lubricating in a HVAC system can be 1-chloro-3,3,3 trifluoroethene (E) with about 10 to about 50% of 1,1,1,4,4,4 hexafluorobutene (E); 1-chloro-3,3,3 trifluoroethene (E) with about 10 to about 50% of 1,1,1,2,3 pentafluorobutane; 1-chloro-3,3,3 trifluoroethene (E) with about 10 to about 50% of 1,1,1,3,3 pentafluorobutane; 1-chloro-3,3,3 trifluoroethene (E) with about 10 to about 50% of 1,1,2,2,3 pentafluorobutane; 1,1,1,4,4,4 hexafluorobutene (E) with about 10 to about 50% of 1,1,1,2,3 pentafluorobutane; 1,1,1,4,4,4 hexafluorobutene (E) with about 10 to about 50% of 1,1,1,3,3 pentafluorobutane; or 1,1,1,4,4,4 hexafluorobutene (E) with about 10 to about 50% of 1,1,2,2,3 pentafluorobutane.

In some embodiments, the refrigerant may not chemically react to the material of the moving parts. In some embodiments, the refrigerant may not chemically react to steel and/or chrome.

The preferred refrigerants for providing lubrication, for example, in a chiller system can include at least one of or blends there of 1,1, dichloro-2,2,2 trifluoroethane, 1,1,1,2 tetrafluoroethane, 1,1,1,3,3 pentafluoropropane, difluromethane, 1,1 difluoroethane, 1-chloro-3,3,3 trifluoropropene (E), 1-chloro-3,3,3 trifluoropropene (Z), 2-chloro-3,3,3 trifluoropropene, 1,1,dichloro-3,3,3 trifluoropropene, 2,3,3,3 tetrafluoropropene, 1,3,3,3 tetrafluoropropene (E), 1,3,3,3 tetrafluoropropene (Z), 1,2 dichloro-3,3,3 trifluoropropene (E), 1,2 dichloro-3,3,3 trifluoropropene (Z), 1,1,3 trichloro-3,3,3 trifluoropropene, 1,2 dichloroethylene (E), 1,2 dichloroethylene (Z), 1,1 dichloroethylene, 1,1,1,4,4,4 hexafluorobutene (Z), 1,1,1,4,4,4 hexafluorobutene (E), 1,1, 1,2,3 pentafluoropropane, 1,1,1,3,3 pentafluoropropane, Isopentane, and pentane.

In some embodiments, an additive or blend thereof, such as corrosion inhibitor(s) and/or a stabilizer(s) can be added to the refrigerant to prevent and/or reduce refrigerant breaking down. In some embodiments, the additive(s) may be one or more corrosion inhibitors, for example, a chemical(s) that can be absorbed or bound to the surface of the moving parts (such as balls and/or rollers) of the bearings to prevent and/or reduce break down of the moving parts. The broken down material of the moving parts may work as a catalyst for refrigerant break down. Preventing and/or reducing break down of the moving parts can help prevent and/or reduce refrigerant break down. In some embodiments, the corrosion inhibitor can be a corrosion inhibitor for iron or copper containing material.

In some embodiments, one or more stabilizers, such as chemical(s) that react with the compounds resulting from refrigerant breaking down, can be added to the refrigerant so as to reduce the amount of the compounds resulting from the refrigerant breaking down. In some embodiments, the stabilizers (such as base, triazole) may react with acid resulting from the refrigerant breaking down so as to reduce the acid. In some embodiments, the stabilizer may react with oxygen that may be contained in the refrigerant to reduce the amount of oxygen contained in the refrigerant.

In some embodiments, the additive(s), such as the corrosion inhibitor(s) and/or the stabilizer(s), can be dissolved in the refrigerant. In some embodiments, the corrosion inhibitor and/or the stabilizer may be non-harmful to the environment. In some embodiments, the additive can be added to the refrigerant in amounts of from about 0.001% to about 10%, more preferably from about 0.01% to about 1% by a weight of the refrigerant.

In some embodiments, the corrosion inhibitor and/or stabilizer can include at least one of or blends there of epoxides (such as aromatic epoxides, alkyl epoxides, alkenyl epoxides), terpenes, terpenoids, fullerenes, ascorbic acid, terephthalate, nitromethane, unsaturated hydrocarbons or unsaturated halocarbons, phenols, perfluoropolyether, hindered phenols, hydroxylamines, thiols, phosphites and lactones, siloxane, tolytriazoles, benzotriazole, amines, hydrazine, hexamine, phenylenediamine, dimethyethanolamine, zinc dithiophosphates, quaternary and acyclic amines, quaternized alkyl pyridine, amine/phosphate ester salt, cinnamaldehyde, dibutylamine, diethylhydroxylamine, dimethylethanolamine, 3,5 dinitrobenzoic acid, ethylenediamine, hexamethyleneteramine, 1,2 diaminopropane.

In one preferred embodiment, tolytriazoles and/or benzotriazole may be added to the refrigerant in a range of 0.001% to 0.5% by a weight of the refrigerant. In another preferred embodiment, hydroxylamines and/or dimethylethanol amine may be added to the refrigerant in a range of 0.001% to 0.5% by a weight of the refrigerant. The additive(s) can be added to the refrigerant at the site of refrigerant manufacture or at the site of chiller manufacturer. It will be appreciated that there are various ways to apply the additive(s), for example, including: direct addition to the refrigerant, e.g. the above materials can be added directly to the refrigerant at the source of manufacture or added separately to the unit when the refrigerant is added or during service of the equipment; direct application to the bearings or other critical parts, e.g. the above materials can be added directly to the parts through either a spray on or dip type application during the manufacturing of the equipment or during servicing of the equipment; and indirect application during manufacturing of sub components, e.g. the additives can be applied during a secondary operation, like tube finning operations or machining, when an additive is necessary to help with corrosion, stabilization or machining lubrication during such processes, which can result in indirect contamination of the final unit assembly or during service of the unit.

In some embodiments, the levels of the additive(s) can be monitored in the field by obtaining a refrigerant sample and measuring the levels. And the levels can be adjusted by adding the additive(s).

ASPECTS

Any of aspects 1-8 can be combined with any of aspects 9-20. Any of aspects 9-16 can be combined with any of aspects 17-20. Any of aspects 17-18 can be combined with any of aspects 19-20. Aspect 19 can be combined with aspect 20.

Aspect 1. A refrigerant to provide lubrication in a HVAC system, comprising:
at least one refrigerant selected from a group including: 1,1, dichloro-2,2,2 trifluoroethane, 1,1,1,2 tetrafluoroethane, 1,1,1,3,3 pentafluoropropane, difluromethane, 1,1 difluoroethane, 1-chloro-3,3,3 trifluoropropene (E), 1-chloro-3,3,3 trifluoropropene (Z), 2-chloro-3,3,3 trifluoropropene, 1,1, dichloro-3,3,3 trifluoropropene, 2,3,3,3 tetrafluoropropene, 1,3,3,3 tetrafluoropropene (E), 1,3,3,3 tetrafluoropropene (Z), 1,2 dichloro-3,3,3 trifluoropropene (E), 1,2 dichloro-3,3,3 trifluoropropene (Z), 1,1,3 trichloro-3,3,3 trifluoropropene, 1,2 dichloroethylene (E), 1,2 dichloroethylene (Z), 1,1 dichloroethylene, 1,1,1,4,4,4 hexafluorobutene (Z), 1,1,1,4,4,4 hexafluorobutene (E), 1,1,1,2,3 pentafluoropropane, 1,1,1,3,3 pentafluoropropane, Isopentane, and pentane.

Aspect 2. The refrigerant of aspect 1, further comprising:
at least one additive selected from a group consisting of: epoxides, terpenes, terpenoids, fullerenes, ascorbic acid, terephthalate, nitromethane, unsaturated hydrocarbons or unsaturated halocarbons, phenols, perfluoropolyether, hindered phenols, hydroxylamines, thiols, phosphites and lactones, siloxane, tolytriazoles, benzotriazole, amines, hydrazine, hexamine, phenylenediamine, dimethyethanolamine, zinc dithiophosphates, quaternary and acyclic amines, quaternized alkyl pyridine, amine/phosphate ester salt, cinnamaldehyde, dibutylamine, diethylhydroxylamine, dimethylethanolamine, 3,5 dinitrobenzoic acid, ethylenediamine, hexamethyleneteramine, and 1,2 diaminopropane.

Aspect 3. The refrigerant of aspect 2, wherein the additive is added to the refrigerant in a range of 0.001% to 0.5% by a weight of the refrigerant.

Aspect 4. The refrigerant of aspects 2-3, wherein the additive is added to the refrigerant in a range of about 0.01% to about 1% by a weight of the refrigerant.

Aspect 5. The refrigerant of aspects 2-4, wherein tolytriazoles is added to the refrigerant in a range of 0.001% to 0.5% by a weight of the refrigerant.

Aspect 6. The refrigerant of aspects 2-5, wherein benzotriazole is added to the refrigerant in a range of 0.001% to 0.5% by a weight of the refrigerant.

Aspect 7. The refrigerant of aspects 2-6, wherein hydroxylamines is added to the refrigerant in a range of 0.001% to 0.5% by a weight of the refrigerant.

Aspect 8. The refrigerant of aspects 2-7, wherein dimethylethanol amine is added to the refrigerant in a range of 0.001% to 0.5% by a weight of the refrigerant.

Aspect 9. A refrigerant blend to provide lubrication in a HVAC system, comprising 1,1, dichloro-2,2,2 trifluoroethane and at least one refrigerant selected from: 1,1,1,2 tetrafluoroethane, 1,1,1,3,3 pentafluoropropane, difluromethane, 1,1 difluoroethane, 1-chloro-3,3,3 trifluoropropene (E), 1-chloro-3,3,3 trifluoropropene (Z), 2-chloro-3,3,3 trifluoropropene, 1,1,dichloro-3,3,3 trifluoropropene, 2,3,3,3 tetrafluoropropene, 1,3,3,3 tetrafluoropropene (E), 1,3,3,3 tetrafluoropropene (Z), 1,2 dichloro-3,3,3 trifluoropropene (E), 1,2 dichloro-3,3,3 trifluoropropene (Z), 1,1,3 trichloro-3,3,3 trifluoropropene, 1,2 dichloroethylene (E), 1,2 dichloroethylene (Z), 1,1 dichloroethylene, 1,1,1,4,4,4 hexafluorobutene (Z), 1,1,1,4,4,4 hexafluorobutene (E), 1,1,1,2,3 pentafluoropropane, 1,1,1,3,3 pentafluoropropane, Isopentane, and pentane.

Aspect 10. The refrigerant blend of aspect 9, further comprising:
at least one additive selected from a group consisting of: epoxides, terpenes, terpenoids, fullerenes, ascorbic acid, terephthalate, nitromethane, unsaturated hydrocarbons or unsaturated halocarbons, phenols, perfluoropolyether, hindered phenols, hydroxylamines, thiols, phosphites and lactones, siloxane, tolytriazoles, benzotriazole, amines, hydrazine, hexamine, phenylenediamine, dimethyethanolamine, zinc dithiophosphates, quaternary and acyclic amines, quaternized alkyl pyridine, amine/phosphate ester salt, cinnamaldehyde, dibutylamine, diethylhydroxylamine, dimethylethanolamine, 3,5 dinitrobenzoic acid, ethylenediamine, hexamethyleneteramine, and 1,2 diaminopropane.

Aspect 11. The refrigerant blend of aspect 10, wherein the additive is added to the refrigerant in a range of 0.001% to 0.5% by a weight of the refrigerant.

Aspect 12. The refrigerant blend of aspects 10-11, wherein the additive is added to the refrigerant in a range of about 0.01% to about 1% by a weight of the refrigerant.

Aspect 13. The refrigerant blend of aspects 10-12, wherein tolytriazoles is added to the refrigerant in a range of 0.001% to 0.5% by a weight of the refrigerant.

Aspect 14. The refrigerant blend of aspects 10-13, wherein benzotriazole is added to the refrigerant in a range of 0.001% to 0.5% by a weight of the refrigerant.

Aspect 15. The refrigerant blend of aspects 10-14, wherein hydroxylamines is added to the refrigerant in a range of 0.001% to 0.5% by a weight of the refrigerant.

Aspect 16. The refrigerant blend of aspects 10-15, wherein dimethylethanol amine is added to the refrigerant in a range of 0.001% to 0.5% by a weight of the refrigerant.

Aspect 17. An oil-Free HVAC system, comprising:
1,1, dichloro-2,2,2 trifluoroethane; and
at least one additive selected from a group consisting of: epoxides, terpenes, terpenoids, fullerenes, ascorbic acid, terephthalate, nitromethane, unsaturated hydrocarbons or unsaturated halocarbons, phenols, perfluoropolyether, hindered phenols, hydroxylamines, thiols, phosphites and lactones, siloxane, tolytriazoles, benzotriazole, amines, hydrazine, hexamine, phenylenediamine, dimethyethanolamine, zinc dithiophosphates, quaternary and acyclic amines, quaternized alkyl pyridine, amine/phosphate ester salt, cinnamaldehyde, dibutylamine, diethylhydroxylamine, dimethylethanolamine, 3,5 dinitrobenzoic acid, ethylenediamine, hexamethyleneteramine, and 1,2 diaminopropane.

Aspect 18. The oil-free HVAC system of aspect 17, further comprising:
at least one refrigerant selected from a group including: 1,1,1,2 tetrafluoroethane, 1,1,1,3,3 pentafluoropropane, difluromethane, 1,1 difluoroethane, 1-chloro-3,3,3 trifluoropropene (E), 1-chloro-3,3,3 trifluoropropene (Z), 2-chloro-3,3,3 trifluoropropene, 1,1,dichloro-3,3,3 trifluoropropene, 2,3,3,3 tetrafluoropropene, 1,3,3,3 tetrafluoropropene (E), 1,3,3,3 tetrafluoropropene (Z), 1,2 dichloro-3,3,3 trifluoropropene (E), 1,2 dichloro-3,3,3 trifluoropropene (Z), 1,1,3 trichloro-3,3,3 trifluoropropene, 1,2 dichloroethylene (E), 1,2 dichloroethylene (Z), 1,1 dichloroethylene, 1,1,1,4,4,4 hexafluorobutene (Z), 1,1,1,4,4,4 hexafluorobutene (E), 1,1,1,2,3 pentafluoropropane, 1,1,1,3,3 pentafluoropropane, Isopentane, and pentane.

19. A refrigerant blend to provide lubrication in a HVAC system, comprising:
at least two refrigerants selected from a group including: 1,1, dichloro-2,2,2 trifluoroethane, 1,1,1,2 tetrafluoroethane, 1,1,1,3,3 pentafluoropropane, difluromethane, 1,1 difluoroethane, 1-chloro-3,3,3 trifluoropropene (E), 1-chloro-3,3,3 trifluoropropene (Z), 2-chloro-3,3,3 trifluoropropene, 1,1, dichloro-3,3,3 trifluoropropene, 2,3,3,3 tetrafluoropropene, 1,3,3,3 tetrafluoropropene (E), 1,3,3,3 tetrafluoropropene (Z), 1,2 dichloro-3,3,3 trifluoropropene (E), 1,2 dichloro-3,3,3 trifluoropropene (Z), 1,1,3 trichloro-3,3,3 trifluoropropene, 1,2 dichloroethylene (E), 1,2 dichloroethylene (Z), 1,1 dichloroethylene, 1,1,1,4,4,4 hexafluorobutene (Z), 1,1,1,4,4,4 hexafluorobutene (E), 1,1,1,2,3 pentafluoropropane, 1,1,1,3,3 pentafluoropropane, Isopentane, and pentane.

Aspect 20. A method of providing lubrication in an oil-free HVAC system, comprising:
providing 1,1, dichloro-2,2,2 trifluoroethane to mating surfaces of a moving part in the HVAC system.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What claimed is:

1. An oil-free refrigerant that provides lubrication in an HVAC system, comprising:
   a refrigerant blend including 1,2 dichloroethylene (E) and 1,1,1,4,4,4 hexafluorobutene (Z); and
   at least one corrosion inhibitor or stabilizer additive selected from the group consisting of: epoxides, terpenes, unsaturated hydrocarbons or unsaturated halocarbons, phenols, hindered phenols, hydroxylamines, siloxane, tolytriazoles, phenylenediamine, dimethyethanolamine, quaternary and acyclic amines, cinnamaldehyde, dibutylamine, and ethylenediamine.

2. The refrigerant of claim 1, wherein the additive is added to the refrigerant in a range of 0.001% to 0.5% by a weight of the refrigerant.

3. The refrigerant of claim 1, wherein the additive is added to the refrigerant in a range of about 0.01% to about 1% by a weight of the refrigerant.

4. The refrigerant of claim 1, wherein hydroxylamines is added to the refrigerant in a range of 0.001% to 0.5% by a weight of the refrigerant.

5. An oil-free HVAC system, comprising:
   1,2 dichloroethylene (E) and 1,1,1,4,4,4 hexafluorobutene (Z); and
   at least one corrosion inhibitor or stabilizer additive selected from the group consisting of: epoxides, terpenes, unsaturated hydrocarbons or unsaturated halocarbons, phenols, hindered phenols, hydroxylamines, siloxane, tolytriazoles, phenylenediamine, dimethyethanolamine, quaternary and acyclic amines, cinnamaldehyde, dibutylamine, and ethylenediamine.

6. A method of providing lubrication in an oil-free HVAC system, comprising:
providing the oil-free refrigerant of claim 1 to mating surfaces of a moving part in the HVAC system.

* * * * *